(12) United States Patent
Li (10) Patent No.: US 10,205,479 B2
(45) Date of Patent: Feb. 12, 2019

(54) PROTECTING AND SUPPORTING DEVICE FOR ELECTRONIC TABLET DEVICE

(71) Applicant: You Li, Zhejiang (CN)

(72) Inventor: You Li, Zhejiang (CN)

( * ) Notice: Subject to any disclaimer, the term of this patent is extended or adjusted under 35 U.S.C. 154(b) by 0 days.

(21) Appl. No.: 15/580,184

(22) PCT Filed: Jul. 7, 2015

(86) PCT No.: PCT/CN2015/083437
§ 371 (c)(1),
(2) Date: Dec. 6, 2017

(87) PCT Pub. No.: WO2016/201743
PCT Pub. Date: Dec. 22, 2016

(65) Prior Publication Data
US 2018/0145714 A1 May 24, 2018

(30) Foreign Application Priority Data
Jun. 19, 2015 (CN) .......................... 2015 1 0351152

(51) Int. Cl.
| | |
|---|---|
| *H04M 1/00* | (2006.01) |
| *H04B 1/3888* | (2015.01) |
| *G06F 1/16* | (2006.01) |
| *E05D 3/18* | (2006.01) |
| *E05D 7/06* | (2006.01) |
| *E05D 11/08* | (2006.01) |
| *F16C 29/02* | (2006.01) |
| *F16M 13/00* | (2006.01) |
| *G06F 1/18* | (2006.01) |

(52) U.S. Cl.
CPC ............. *H04B 1/3888* (2013.01); *E05D 3/18* (2013.01); *E05D 7/06* (2013.01); *E05D 11/082* (2013.01); *F16C 29/02* (2013.01); *F16M 13/005* (2013.01); *G06F 1/16* (2013.01); *G06F 1/181* (2013.01)

(58) Field of Classification Search
None
See application file for complete search history.

(56) References Cited

U.S. PATENT DOCUMENTS

| | | | | |
|---|---|---|---|---|
| 7,054,441 | B2 * | 5/2006 | Pletikosa | ............... G06F 1/1626 361/679.24 |
| 7,194,086 | B2 * | 3/2007 | Pletikosa | ............... G06F 1/1626 361/679.3 |
| 7,324,642 | B2 * | 1/2008 | Pletikosa | ............... G06F 1/1626 361/679.27 |
| 8,607,976 | B2 * | 12/2013 | Wu | ....................... G06F 1/1626 206/320 |

(Continued)

*Primary Examiner* — Tuan A Tran (57) ABSTRACT

A protecting and supporting device for an electronic tablet device includes: slideways (2) provided on a left and a right side of the electronic tablet device (1) and a protection housing (3). Sliding rails (4) are provided on both a left side and a right side of the protection housing (3); wherein two slideways are provided between two sliding rails, the left slideway is slidably connected to the sliding rail on the right side of the protection housing by a sliding shaft (5), the right slideway is slidably connected to the sliding rail on the right side of the protection housing by the other sliding shaft, each sliding shaft can slide in the slideway and the sliding rail on the same side; the slideway and the sliding rail on the same side can rotate relative to the sliding shaft on the same side.

11 Claims, 12 Drawing Sheets

(56) References Cited

U.S. PATENT DOCUMENTS

| | | | | |
|---|---|---|---|---|
| 8,905,232 B2* | 12/2014 | Hsieh | ................... | G06F 1/1624 |
| | | | | 206/320 |
| 9,769,293 B2* | 9/2017 | Gu | ...................... | H04M 1/0235 |
| 9,933,817 B2* | 4/2018 | Fathollahi | ............. | G06F 1/1628 |
| 2004/0150628 A1* | 8/2004 | Huang | ..................... | A45C 3/02 |
| | | | | 345/173 |
| 2007/0217129 A1* | 9/2007 | Chuang | .................. | G06F 1/162 |
| | | | | 361/679.55 |
| 2011/0297581 A1* | 12/2011 | Angel | .................... | F16M 13/04 |
| | | | | 206/736 |
| 2014/0118929 A1* | 5/2014 | Leung | ................... | G06F 1/162 |
| | | | | 361/679.55 |

\* cited by examiner

PROTECTING AND SUPPORTING DEVICE FOR ELECTRONIC TABLET DEVICE

CROSS REFERENCE OF RELATED APPLICATION

This is a U.S. National Stage under 35 U.S.C 371 of the International Application PCT/CN2015/083437, filed Jul. 7, 2015, which claims priority under 35 U.S.C. 119(a-d) to CN 201510351152.0, filed Jun. 19, 2015.

BACKGROUND OF THE PRESENT INVENTION

Field of Invention

The present invention relates to the technical field of the electronic tablet device, and more particularly to a protecting and supporting device for an electronic tablet device.

Description of Related Arts

The utilization deficiency of electronic tablet devices is as follows. The electronic tablet devices are not capable of standing up until being held by hand or a support and people often overlook while utilizing the electronic tablet devices. A long bow will affect human health. Furthermore, the touch screen of the electronic tablet devices has the function of human-computer interaction; damages on the touch screen easily lead to failure in human-computer interaction, which causes inconvenience to learning and working of people. The protection structure of the conventional electronic tablet devices only achieves the function of protecting the touch screen, but has the drawbacks of being not capable of standing up independently. Thus the conventional electronic tablet devices have small functionality and attractiveness, and the market competitiveness thereof is poor.

A previous patent application by the same applicants with the present invention and with a publication number CN 103760954A of a multi-purpose protecting and supporting device for electronic tablet device discloses that a protection cover is provided on the electronic tablet device, and the protection cover forms a sliding connection with the electronic tablet device, and furthermore, the electronic tablet device is capable of tilting on both ends of the protection cover. However, the application has drawbacks as follows. When the electronic tablet devices are stood on both ends of the protection cover, dumping is easily caused and the tilting angle is restricted to some extent.

SUMMARY OF THE PRESENT INVENTION

In view of the drawbacks in the conventional art, an object of the present invention is to provide a protecting and supporting device for an electronic tablet device.

The object of the present invention is achieved by the following technical solutions.

A protecting and supporting device for an electronic tablet device, comprises: two slideways provided on a left side and a right side of the electronic tablet device and a protection housing, wherein two sliding rails are respectively provided on a left side and a right side of the protection housing, the two slideways are provided between the two sliding rails; the slideway on the left side is slidably connected with the sliding rail on the left side of the protection housing by a first sliding shaft, the slideway on the right side is slidably connected with the sliding rail on the right side of the protection housing by a second sliding shaft, each sliding shaft is capable of sliding in the slideway and the sliding rail which are on an identical side, and the slideway and the sliding rail are capable of rotating around the sliding shaft which is on an identical side.

Preferably, the sliding shaft and the sliding rail form a positionable sliding connection, wherein a specific structure is: a strip-shaped sliding hole is provided on the sliding rail, a plurality of positioning holes are provided in sequence along a length of the strip-shaped sliding hole; wherein the sliding shaft is capable of slidably connecting with the strip-shaped sliding holes and is positionable in the positioning hole.

Preferably, a pulley is provided on an end of the sliding shaft where the sliding shaft and the sliding rail is corporately sliding; the pulley is a kidney-shaped wheel body or a round wheel made of elastic material.

Preferably, a strip-shaped hole is provided on the strip-shaped sliding hole on an internal side of the siding rails, wherein a structure of the sliding shaft comprises: an internal half shaft provided in the slideway and an external half shaft provided in the sliding rail; wherein a step is provided on a wall of a shaft hole of the internal half shaft; an internal end of the external half shaft is inserted in the shaft hole of the internal half shaft; a reset spring is provided between an internal end of the external half shaft and a bottom of a shaft hole of the internal half shaft; a clasping ring capable of clasping with the step is provided on an external column surface on the internal end of the external half shaft; and a stopping ring is provided on an external end of the external half shaft.

Preferably, the positioning hole is a groove provided on a hole wall of the strip-shaped sliding hole; an elastic member contacting and connecting with the hole wall of the strip-shaped sliding hole is provided on the sliding shaft; the elastic member is snapped in the groove for positioning; the elastic member is pressed and separated from the groove by pushing the sliding shaft; wherein the sliding shaft is capable of sliding in the strip-shaped sliding hole.

Preferably, a supporting flap is hinged on the protection housing, wherein the supporting flap is capable of turning over toward the protection housing to fit with the protection housing.

Preferably, a hollow groove for receiving the supporting flap is provided on the protection housing; wherein the supporting flap is hinged on the hollow groove and is capable of turning into the hollow groove.

A protecting and supporting device for an electronic tablet device, comprises: a protection housing; wherein two slideways are respectively provided on both a left side and a right side of the protection housing; a sliding shaft capable of being fixed on a left side and a right side of the electronic tablet device is slidably provided in the slideways; the sliding shaft is capable of rotating in the slideways and form a positionable sliding connection by a positioning mechanism.

Preferably, a supporting flap is hinged on the protection housing, wherein the supporting flap is capable of turning over toward the protection housing to fit with the protection housing.

Preferably, a hollow groove for receiving the supporting flap is provided on the protection housing; wherein the supporting flap is hinged on the hollow groove and is capable of turning into the hollow groove.

Preferably, the sliding shaft is capable of rotating in the sliding rails and forming a positionable sliding connection by a positioning mechanism, wherein a specific structure is: a strip-shaped sliding hole is provided on the sliding rail, a plurality of positioning holes are provided in sequence along a length of the strip-shaped sliding hole; wherein the sliding shaft is capable of slidably connecting with the strip-shaped sliding holes and is positionable in the positioning hole.

Preferably, a pulley is provided on an end of the sliding shaft where the sliding shaft and the sliding rail is corporately sliding; the pulley is a kidney-shaped wheel body or a round wheel made of elastic material.

Preferably, a strip-shaped hole is provided on the strip-shaped sliding hole on an internal side of the siding rails, wherein a structure of the sliding shaft comprises: internal half shafts provided on a left side and a right side of the electronic tablet device and an external half shaft provided in the sliding rail; wherein a step is provided on a wall of a shaft hole of the internal half shaft; an internal end of the external half shaft is inserted in the shaft hole of the internal half shaft; a reset spring is provided between an internal end of the external half shaft and a bottom of a shaft hole of the internal half shaft; a clasping ring capable of clasping with the step is provided on an external column surface on the internal end of the external half shaft; and a stopping ring is provided on an external end of the external half shaft.

Preferably, the positioning hole is a groove provided on a hole wall of the strip-shaped sliding hole; an elastic member contacting and connecting with the hole wall of the strip-shaped sliding hole is provided on the sliding shaft; the elastic member is ejected out and snapped in the groove for positioning; the elastic member is pressed and separated from the groove by pushing the sliding shaft; wherein the sliding shaft is capable of sliding in the strip-shaped sliding hole.

Compared with the conventional arts, the present invention has beneficial effects as follows.

1. The present invention has a simple structure and achieves double functions of relative sliding and relative rotating between the electronic tablet device and the protection housing. A turnover with a large angle and relative sliding can be implemented between the electronic tablet device and the protection shell, which reaches a variety of application state to meet different habits of consumers, so as to achieve a better viewing and application effect.

2. In order to ensure different tilting and standing angles of the electronic tablet device, the present invention adopts improvements of a sliding shaft positioned structure and an integral supporting flap provided on the protection housing, in such a manner that the technical effect of a fixed titling and standing angle of the electronic tablet device is achieved.

3. The structure of the positioning mechanism of the present invention is simple and diverse, the sliding shaft is capable of effectively positioned in the sliding rail, so as to prevent the electronic tablet device from slipping after standing up.

4. The present invention has various changing state, which is capable of increasing the keyboard, in such a manner that the electronic tablet device forms a working state of a notebook computer, which is more convenient for application.

5. The operation of the present invention is capable of changing states easily and is very convenient. Furthermore, the present invention not only has various functions, but also is capable of attracting consumers and thus has a prosperous future.

6. The present invention has characteristics of simple structures, less components, low production costs and easy assembly.

DETAILED DESCRIPTION OF THE PREFERRED EMBODIMENT

Referring to FIGS. 1-27, further description of the present invention is illustrated combining with the accompanying drawings and the preferred embodiments.

Referring to FIGS. 1-12, according to preferred embodiments 1 and 2, the present invention provides a protecting and supporting device for an electronic tablet device, comprising: two slideways 2 provided on a left side and a right side of the electronic tablet device 1 and a protection housing 3, two sliding rails 4 are respectively provided on a left side and a right side of the protection housing 3, the two slideways 2 are provided between the two sliding rails 4; the slideway 2 on the left side is slidably connected with the sliding rail 4 on the left side of the protection housing 3 by a first sliding shaft 5, the right slideway 2 is slidably connected with the sliding rail 4 on the right side of the protection housing 3 by a second sliding shaft 5, each sliding shaft 5 is capable of sliding in the slideway 2 and the sliding rail 4 on the same side, and the slideway 2 and the sliding rail 4 are capable of rotating around the sliding shaft 5 which is on an identical side.

Working principle of the present invention is as follows. The slideway 2 is slidably connected with the sliding shaft 5, meanwhile, the sliding shaft 5 is slidably connected with the sliding rail 4. The slideway 2 and the sliding rail 4 are capable of rotating around the sliding shaft on the identical side. The slideway 2 is fixed on the electronic tablet device 1, the sliding rail 4 is fixed on the protection housing 3. Thus various turning over, stretching and overlapping effects can be formed.

Figure 1:
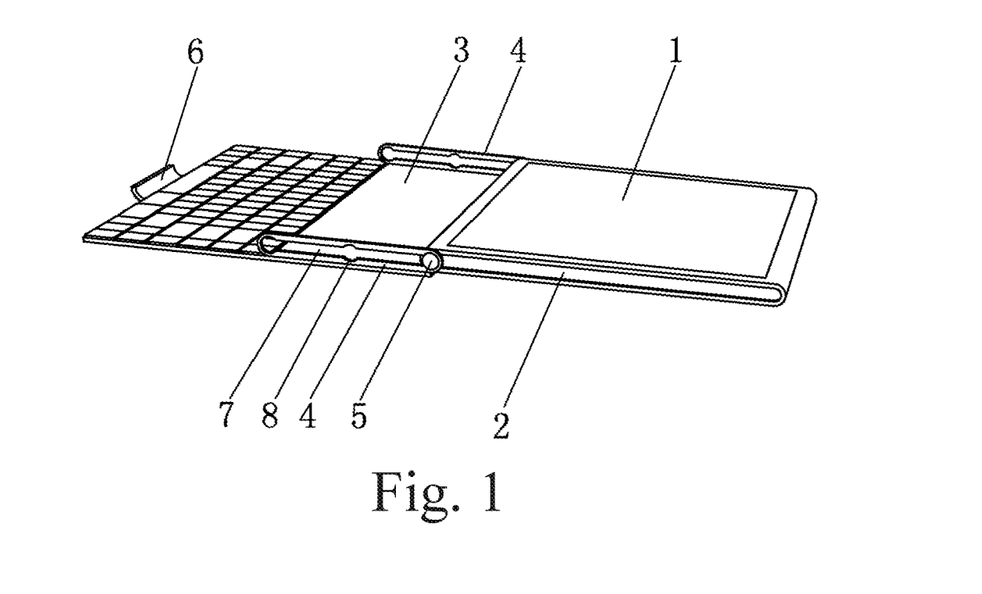
FIG. 1 is a sketch view of a basic structure of the present invention.

FIG. 1 shows that the electronic tablet device 1 is in a status of facing upward and horizontally stretched state, at the moment, the slideways 2 are connected end to end with the slide rails 4 via the sliding shaft 5.

Figure 2:
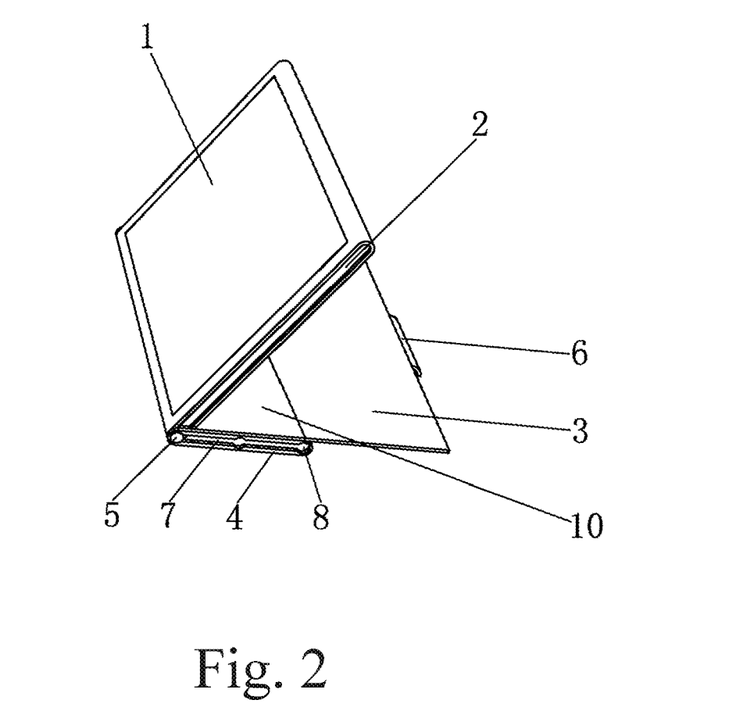
FIG. 2 is a sketch view showing a first utilizing state according to a first preferred embodiment of the present invention.

FIG. 2 shows that the protection housing 3 in the FIG. 1 is turned around the sliding shaft 5 toward a rear direction of the electronic tablet device 1, in such a manner that the electronic tablet device 1 is in a tilting status.

Figure 3:
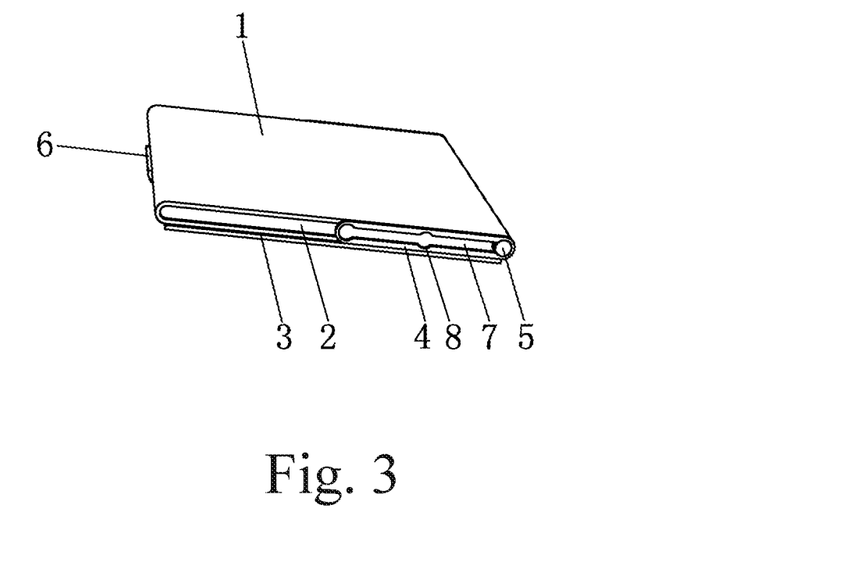
FIG. 3 is a sketch view showing a second utilizing state of the structure in FIG. 2.

FIG. 3 shows a status that the electronic tablet device 1 in the FIG. 1 is turned leftward for 180 degrees around the sliding shaft 5. At this moment, the electronic tablet device 1 faces downward; and the slideway 2 overlaps one end of the sliding shaft 5 and is connected via the sliding shaft 5.

Figure 4:
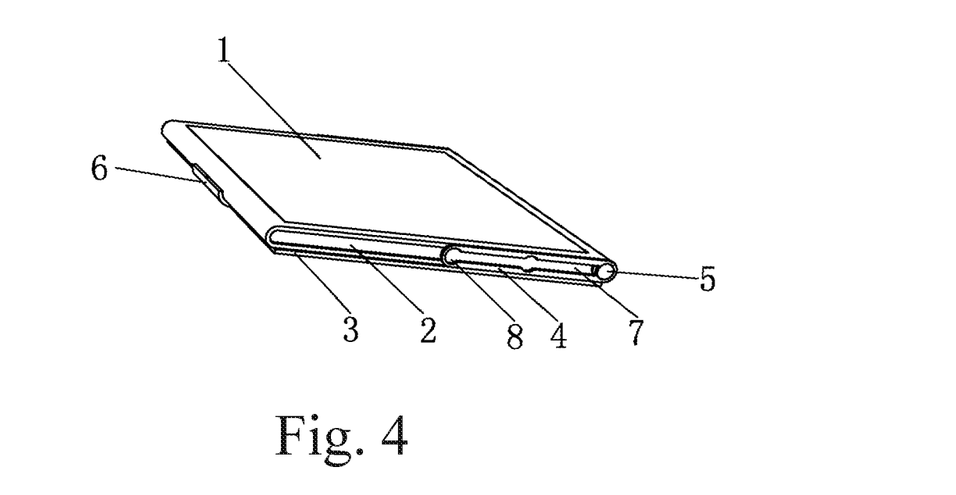
FIG. 4 is a sketch view showing a third utilizing state of the structure in FIG. 2.

FIG. 4 shows a status that the electronic tablet device 1 in the FIG. 1 faces upward and is horizontally pushed leftward. At this moment, the slideway 2 overlaps one end of the sliding shaft 5 and is connected via the sliding shaft 5.

Figure 5:
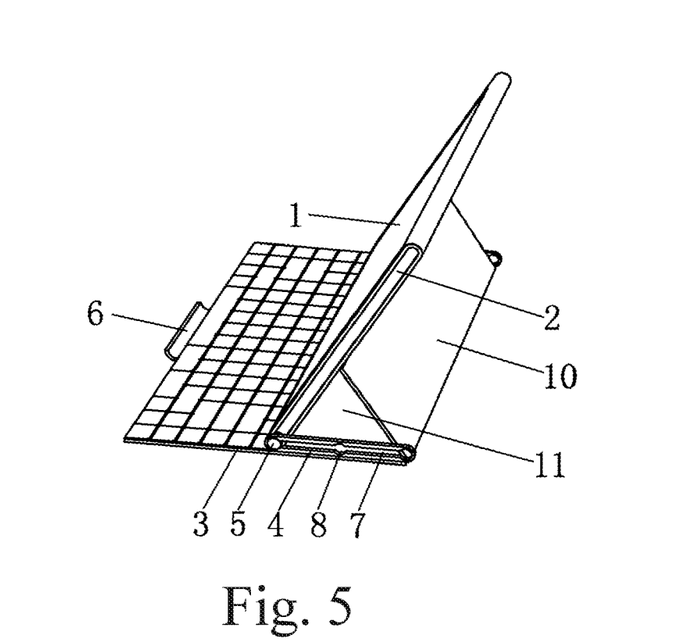
FIG. 5 is a sketch view showing a fourth utilizing state of the structure in FIG. 2.
Figure 6:
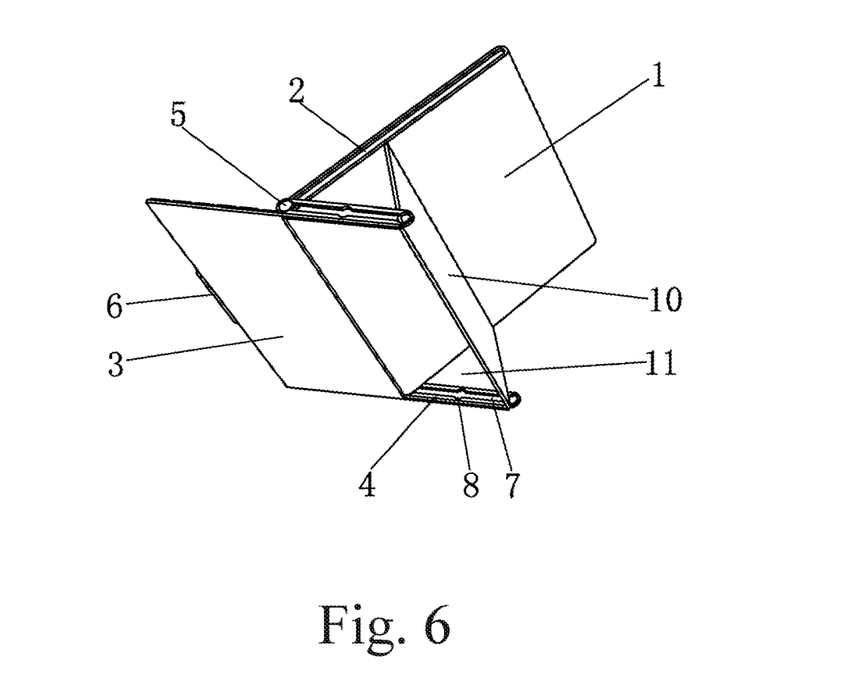
FIG. 6 is a bottom structural view of the structure in FIG. 5.
Figure 7:
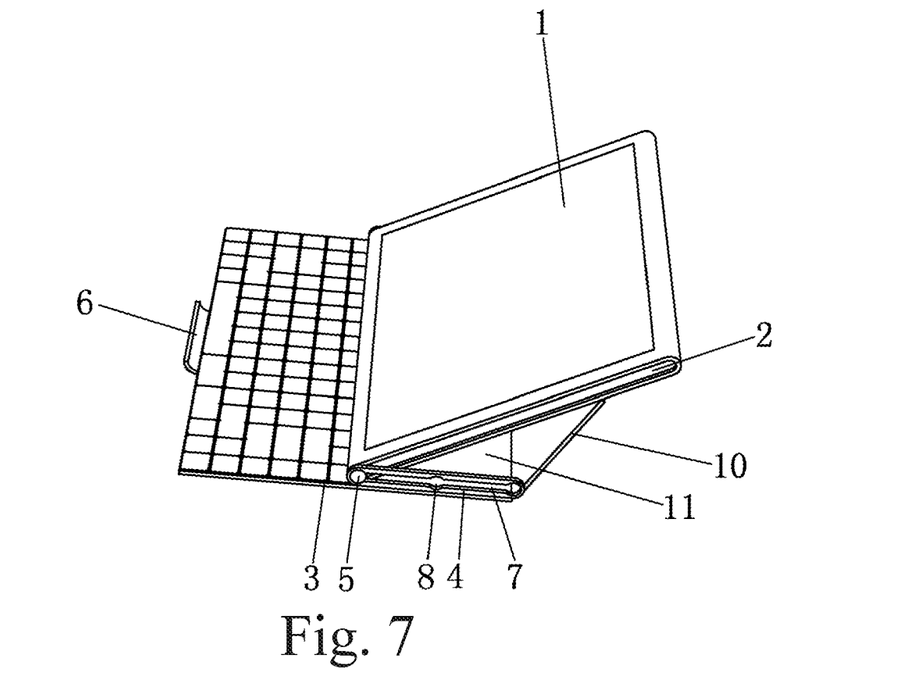
FIG. 7 is a sketch view showing a fifth utilizing state of the structure in FIG. 2.
Figure 8:
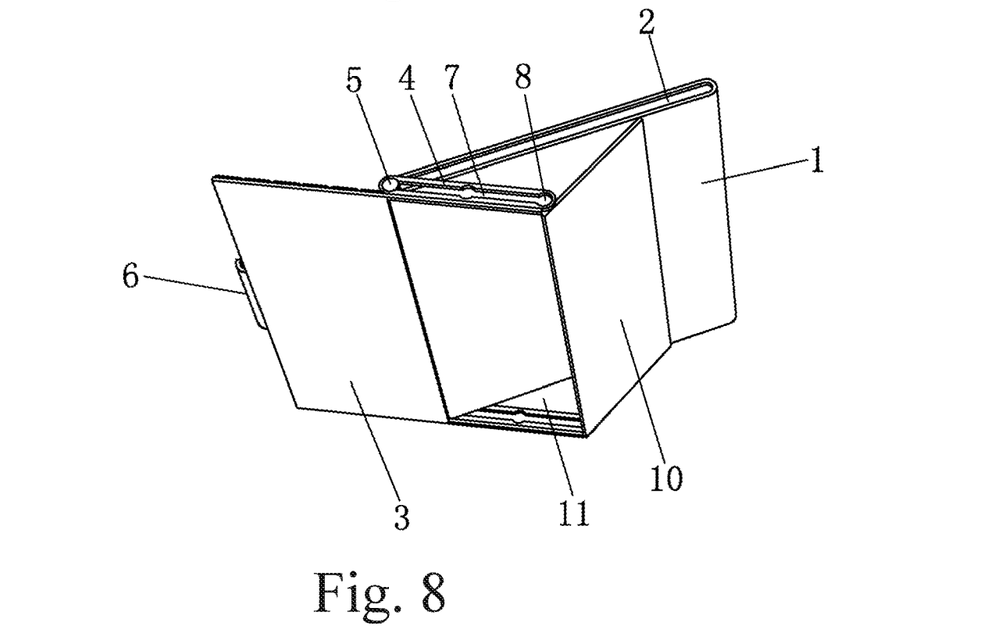
FIG. 8 is a bottom structural sketch view of the structure in FIG. 7.

FIGS. 5 and 7 show that the electronic tablet device 1 is in a tilting state with the help of the structure design of the protection housing 3. The slideway 2 is in a tilting state, an end of the slideway 2 is connected with the sliding rail 4 by the sliding shaft 5. FIG. 5 shows a state that the electronic tablet device 1 is tilting at a small angle and FIG. 7 shows that the electronic tablet device 1 is tilting a large angle.

FIGS. 5-8 show that a hollow groove 11 with an identical shape with a supporting flap 10 is provided on the protection housing 3.

FIGS. 9-12 show a structure that the protection housing 3 has no hollow groove 11 provided thereon.

As shown in FIG. 5, the hollow groove 11 with an identical shape with the supporting flap 10 is provided on the protection housing 3, wherein the supporting flap 10 is hinged on a side of the hollow groove 11 and the supporting flap 10 is capable of turning into the hollow groove 11.

In the structure showed in FIG. 5, the supporting flap 10 can be hinged on a rear side, a left side or a right side of the hollow groove 11, which is a structure capable of achieving turning support.

When the supporting flap 10 is hinged on the left or the right side of the hollow groove 11, the supporting flap 10 is cut into a left side plate and a right side plate, wherein the left side plate and the right side plate are capable of rotating relatively to support.

Figure 9:
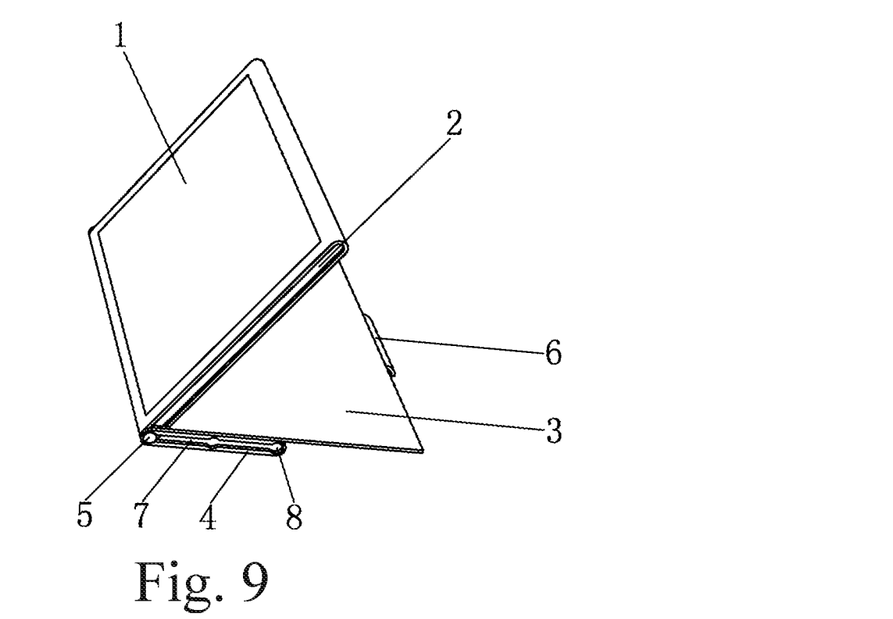
FIG. 9 is a sketch view showing a first utilizing state according to a second preferred embodiment of the present invention.
Figure 10:
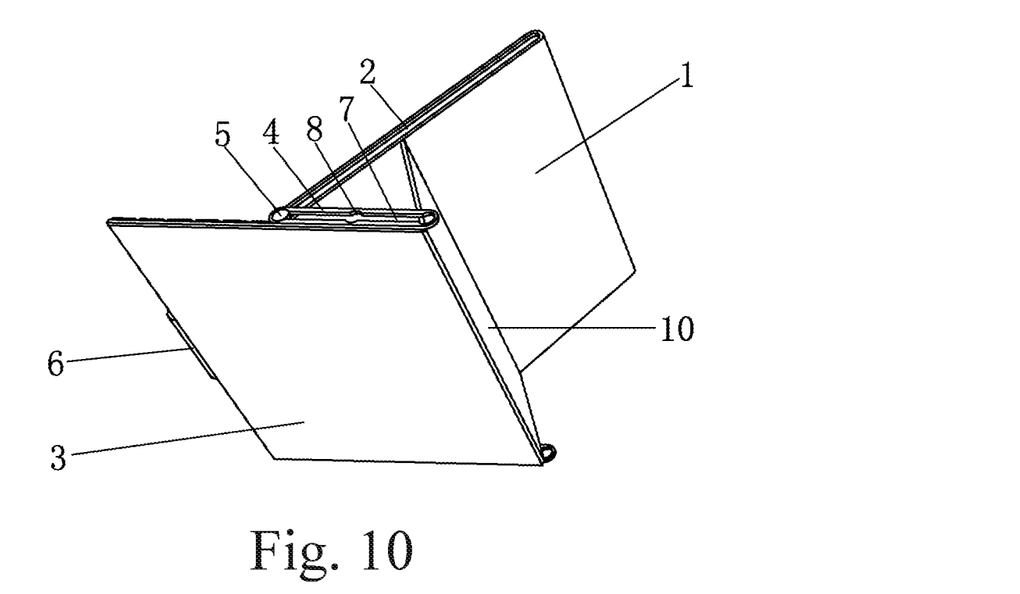
FIG. 10 is a sketch view showing a second utilizing state of the structure in FIG. 9.
Figure 11:
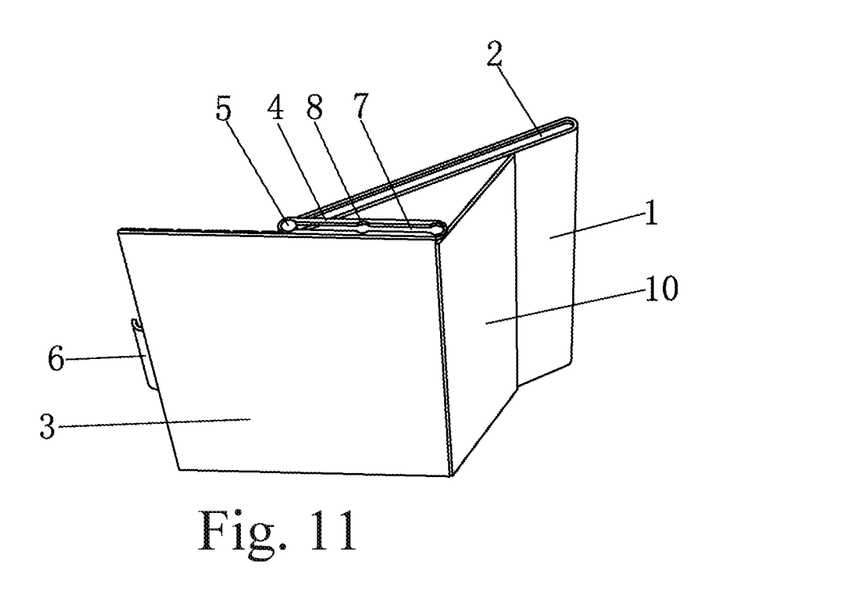
FIG. 11 is a sketch view showing a third utilizing state of the structure in FIG. 9.
Figure 12:
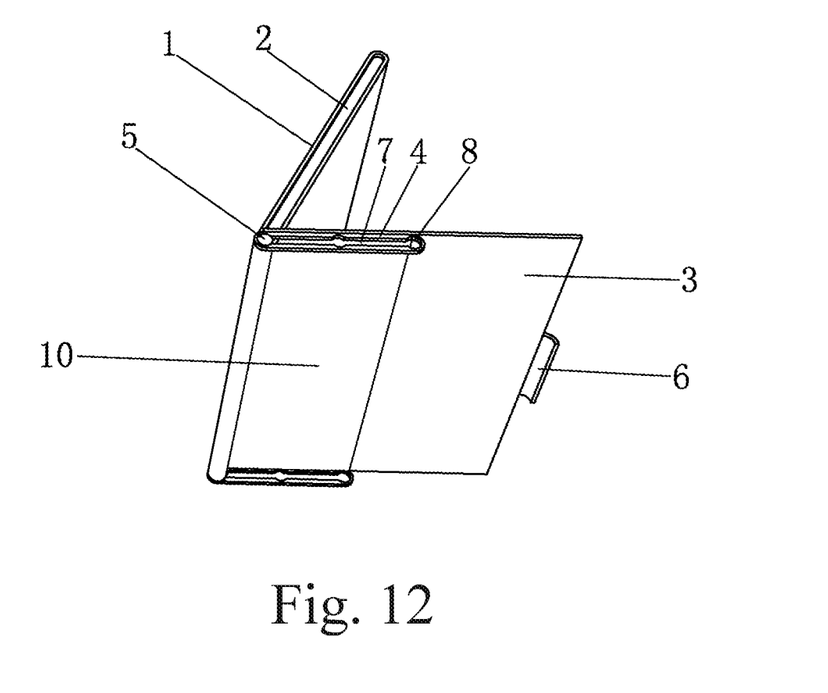
FIG. 12 is a bottom structural view of the structure in FIG. 9.

As shown in FIG. 9 and FIG. 10, the supporting flap 10 is hinged on the rear side, the left side or the right side of the protection housing 3. With the supporting flap 10 provided on one side of the protection housing 3, the supporting flap 10 is capable of turning towards the protection housing 3 to fit the protection housing 3. When the supporting flap 10 is hinged on the left side or the right side, the supporting flap 10 is cut into a left side plate or a right side plate, wherein the left side plate and the right side plate are capable of rotating relatively to support.

A fastening plate 6 which is in an arc shape is provided on a front end of the protection housing 3, wherein the fastening plate 6 is capable of fixing the protection housing 3 and the electronic tablet device 1 when the protection housing 3 is covered on the electronic tablet device 1.

As shown in FIGS. 18-22, a sliding head 500 is provided on an end of the sliding shaft 5 which is slidably connected with the slide way 2, in such a manner that the sliding shaft 5 is matched tightly with the slideway 2, so as to prevent the sliding shaft 5 from sliding off the slideway 2 and avoid the problems of sliding difficulty or noises.

The sliding shaft 5 and the sliding rail 4 form a slidable connection which is capable of being positioned, wherein a specific structure is: a strip-shaped sliding hole 7 is provided on the sliding rail 4. A plurality of positioning holes 8 are provided in sequence along a length direction of the strip-shaped sliding hole 7; wherein the sliding shaft 5 is capable of slidably connected with the strip-shaped sliding holes and is positioned in the positioning hole 8.

A specific structure of the positionable sliding connection structure can be set in the following ways.

Firstly, extending the structure of the single shaft 5 can be achieved. As shown in FIGS. 15-18, the sliding shaft 5 can adopt a structure that, see FIGS. 15 and 17, a pulley 9 is provided on an end of the sliding shaft 5 where the sliding shaft 5 and the sliding rail 4 is corporately sliding. The pulley 9 is a round wheel made of elastic material.

Figure 16:
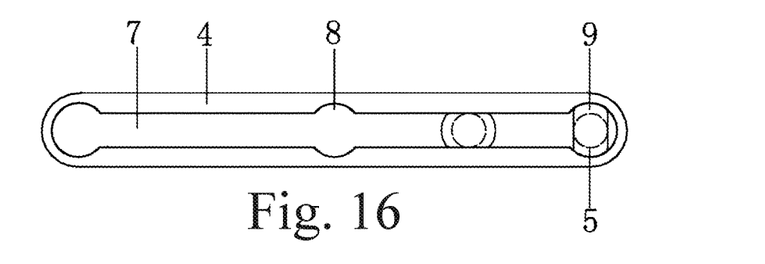
FIG. 16 is a second mode showing coordination of the sliding rails and the sliding shaft according to the first, the second and the third preferred embodiment of the present invention.
Figure 17:
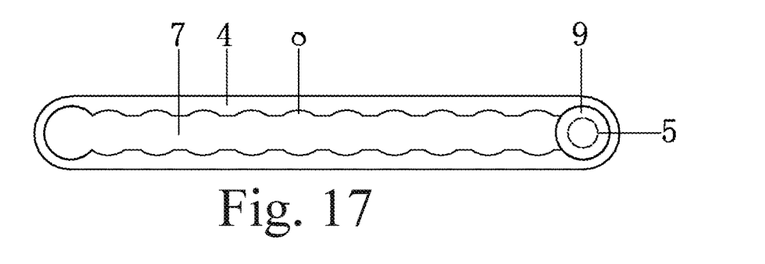
FIG. 17 is a third mode showing coordination of the sliding rails and the sliding shaft according to the first, the second and the third preferred embodiment of the present invention.
Figure 18:
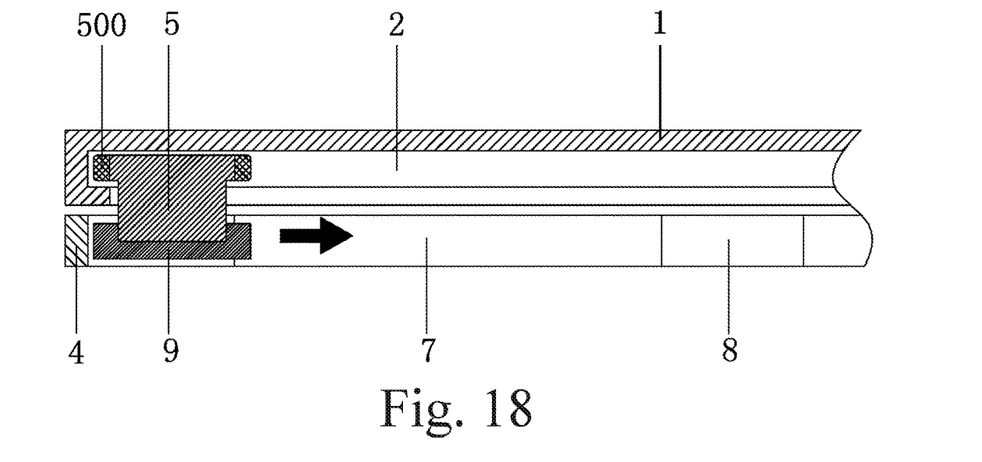
FIG. 18 is a schematic view of the first, the second and the third mode of the coordination of the sliding rails and the sliding shaft according to the first and the second preferred embodiment of the present invention in FIGS. 15-17.

The sliding shaft 5 can also adopt a structure as follows. As shown in FIG. 16, the pulley 9 is a kidney shaped wheel body; wherein a maximum diameter of the kidney shaped wheel body is identical to a diameter of the positioning hole 8. Since the kidney shaped wheel 9 has different diameters, the kidney shaped wheel 9 is capable of respectively cooperating with the strip-shaped sliding hole 7 and the positioning hole 8 after being rotated for 90 degrees, so as to achieve a function of smooth sliding and positioning.

Figure 19:
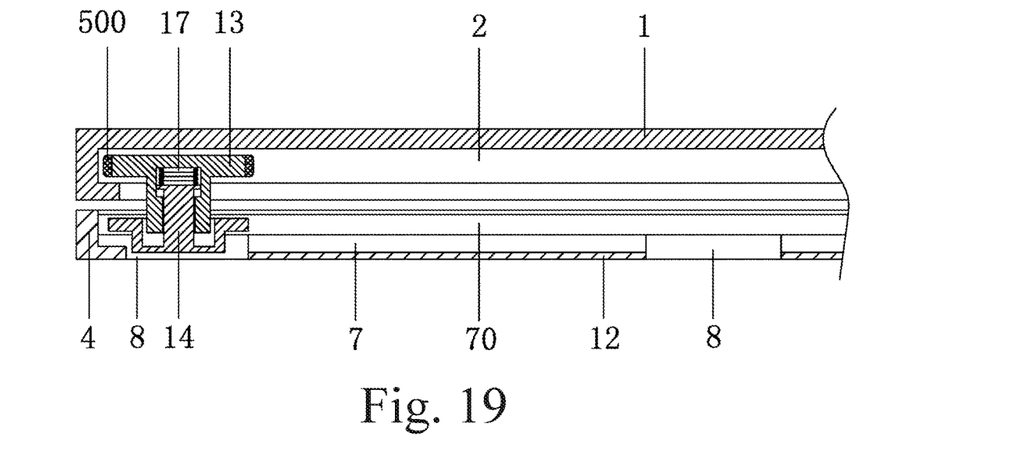
FIG. 19 is a schematic view of a fourth mode of the coordination of the sliding rails and the sliding shaft according to the first and the second preferred embodiment of the present invention.
Figure 20:
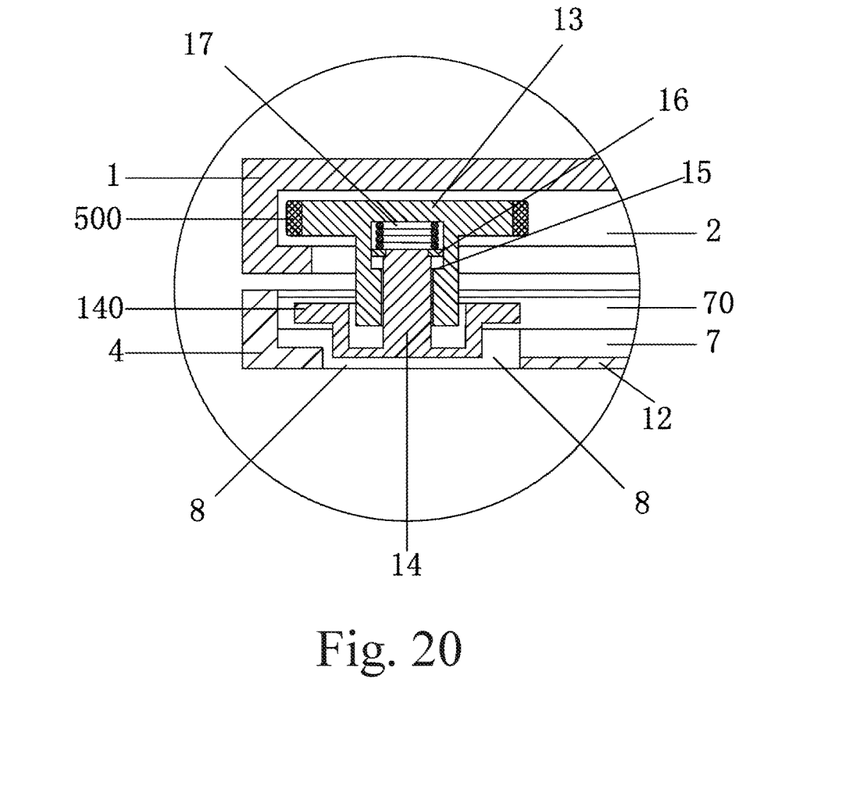
FIG. 20 is an enlarged partial view of the structure in FIG. 19.
Figure 21:
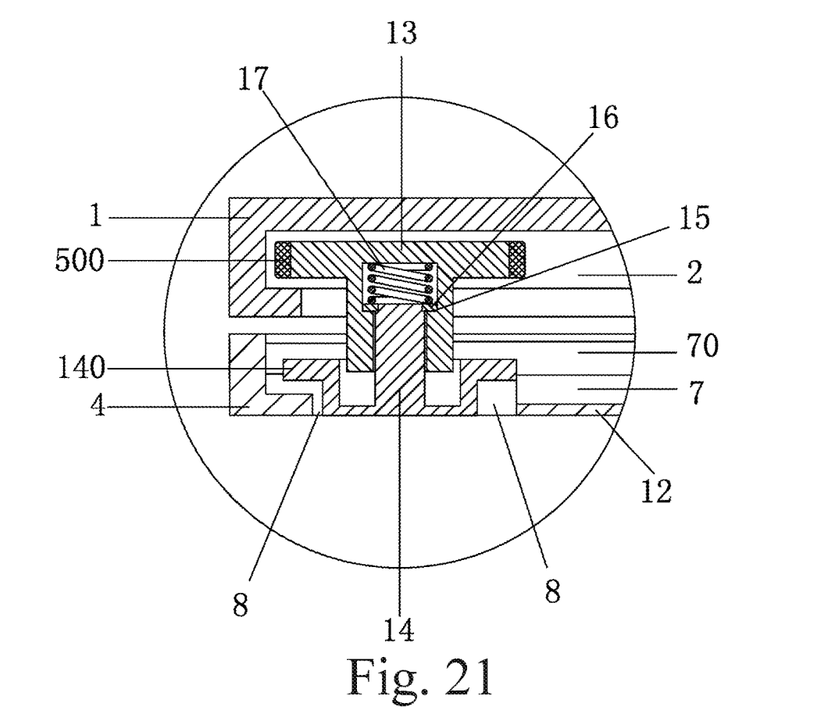
FIG. 21 is a sketch view of the structure in FIG. 20 of another operating state.

Secondly, the structure can be achieved by expansion of the sliding shaft 5 and the strip-shaped sliding hole 7. As shown in FIGS. 19-21, a strip-shaped hole 70 is provided on the strip-shaped sliding hole 7 on an internal side of the sliding rail 4. In design, a width of the strip-shaped hole 70 is greater than a width of the strip-shaped sliding hole 7. The width of the strip-shaped hole 70 is equal to or greater than a diameter of a stopping ring 140. The width of the strip-shaped sliding hole 7 is smaller than the diameter of the stopping ring 140. The diameter of the positioning hole 8 is equal to or greater than the diameter of the stopping ring 140.

A structure of the sliding shaft 5 comprises: an internal half shaft 13 provided in the slideway 2 and an external half shaft 14 provided in the sliding rail 4; wherein a step 15 is provided on a wall of a shaft hole of the internal half shaft 13; an internal end of the external half shaft 14 is inserted in the shaft hole of the internal half shaft 13; a reset spring 17 is provided between an internal end of the external half shaft 14 and a bottom of s shaft hole of the internal half shaft 13; a clasping ring 16 capable of clasping with the step 15 is provided on an external column surface on the internal end of the external half shaft; and a stopping ring 140 is provided on an external end of the external half shaft 14.

A stopping bar 12 is provided in the strip-shaped sliding hole 7 between two adjacent positioning hole 8, the sliding shaft 5 which is sliding in the strip-shaped sliding hole is clamped on an internal side of the stopping strip 12.

A function achieved by the extension structure of the sliding shaft 5 and the strip-shaped sliding hole 7 is as follows.

The external half shaft 14 of the sliding shaft 5 can be pressed to change a whole length of the sliding shaft 5; wherein in an pressed state, the sliding shaft 5 is in a small length, the stopping ring 140 of the sliding shaft 5 is clamped in the strip-shaped hole 70; in a released state, the sliding shaft 5 is in a longer state under the function of the reset spring, the stopping ring 140 of the sliding shaft 5 is clamped in the positioning hole 8 of the strip-shaped sliding hole 7. Thus, in a pressed state, the sliding shaft 5 is not in the positioning hole 8, which achieves sliding in the strip-shaped sliding hole 7; in a released state, if the sliding shaft 5 is in the positioning hole 8, the sliding shaft 5 is inserted in the positioning hole 8, so that lateral sliding of the sliding shaft 5 is restricted; wherein the two states are switched by the pressing force and the elastic force of the return spring.

In actual application:

The electronic tablet device 1 is rotated relative to the protection housing 3; the internal half shaft 13 is rotationally and/or slidably connected with the external half shaft 14.

Relative sliding between the electronic tablet device 1 and the protection housing 3 is as follows. When a length of the sliding shaft 5 is shortened, an external end of the external half shaft 14 of the sliding shaft 5 is stopped inside the stopping strip 12, the stopping ring 140 is stopped in the strip-shaped hole 70, at the moment, the external half shaft 14 is out of restriction of the positioning hole 8. Thus, the electronic tablet device 1 is capable of sliding along the strip-shaped sliding hole 7, when sliding to a required position, i.e., a position of the positioning hole 8, loose the external half shaft 14, so that the external half shaft is ejected into the positioning hole 8, in such a manner that the electronic tablet device 1 is positioned and not capable of sliding.

Figure 22:
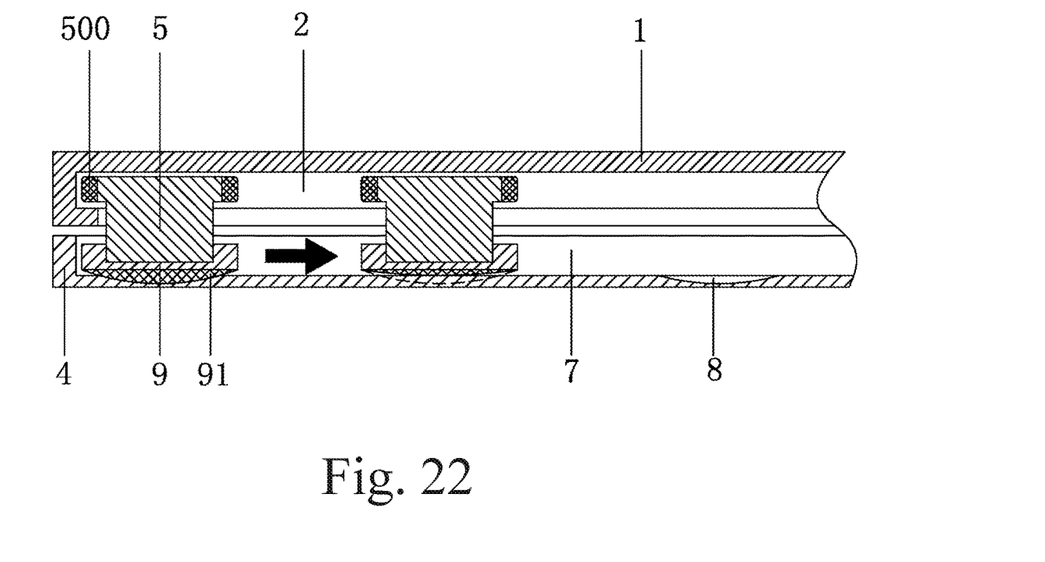
FIG. 22 is a schematic view of a fifth mode of the coordination of the sliding rails and the sliding shaft according to the first preferred embodiment and the second preferred embodiment of the present invention.
Figure 23:
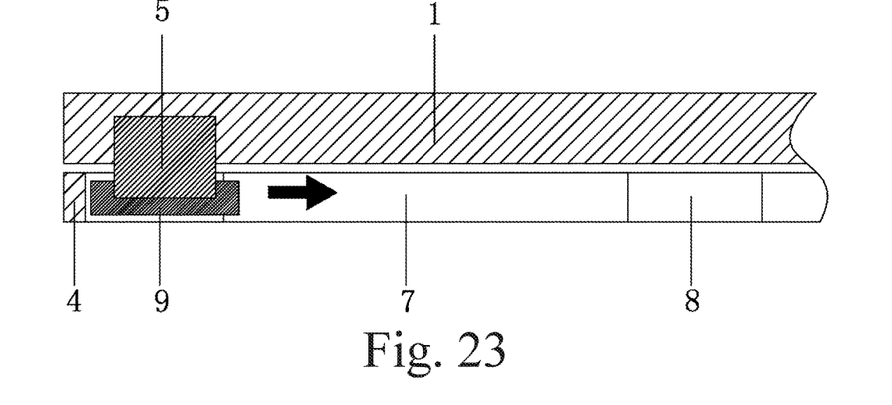
FIG. 23 is a schematic view of the first mode, the second mode and the third mode of the coordination of the sliding rails and the sliding shaft according to the third preferred embodiment of the present invention in FIGS. 15-17.

The structural extension of the sliding shaft 5 and the sliding hole 7 may also be as follows. As shown in FIG. 22, the positioning hole 8 is a groove provided on a hole wall of the strip-shaped sliding hole. An elastic member 91 contacting with the hole wall of the strip-shaped sliding hole is provided on the sliding shaft 5. The elastic member 91 is provided on an external surface of the sliding wheel 9. The elastic member 91 can be pressed and separated from the groove by pushing the sliding shaft 5, at the moment, the sliding shaft 5 is capable of sliding in the strip-shaped sliding hole 7, when the sliding shaft is sliding to a next positioning hole 8, the elastic member 91 can be ejected to be snapped in the groove for positioning.

In the structures mentioned above, the structure of the protection housing 3 is as shown in FIGS. 5-12, wherein the design of the hollow groove 11 in the protection housing 3 not only saves production cost, but also maintains the thinness of the protection housing 3, and the structure is more sophisticated.

Figure 13:
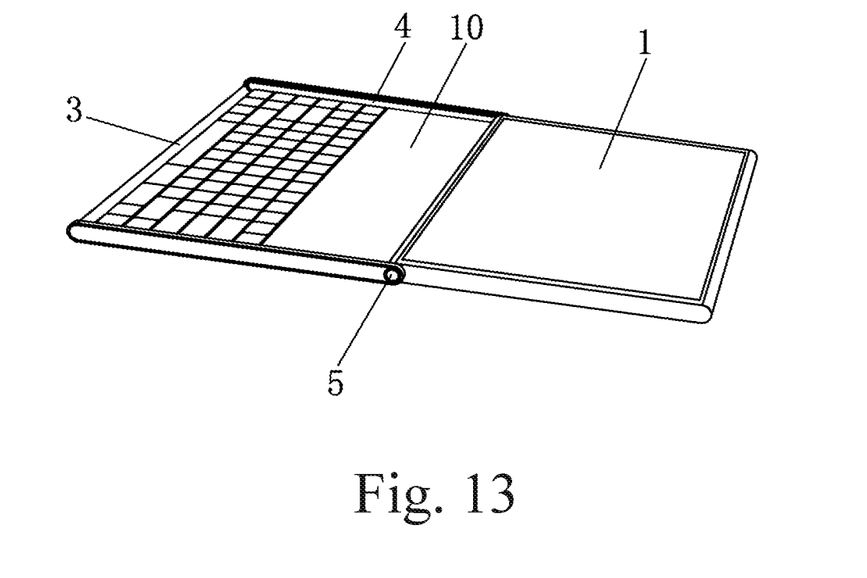
FIG. 13 is a structural sketch view according to a third preferred embodiment of the present invention.
Figure 14:
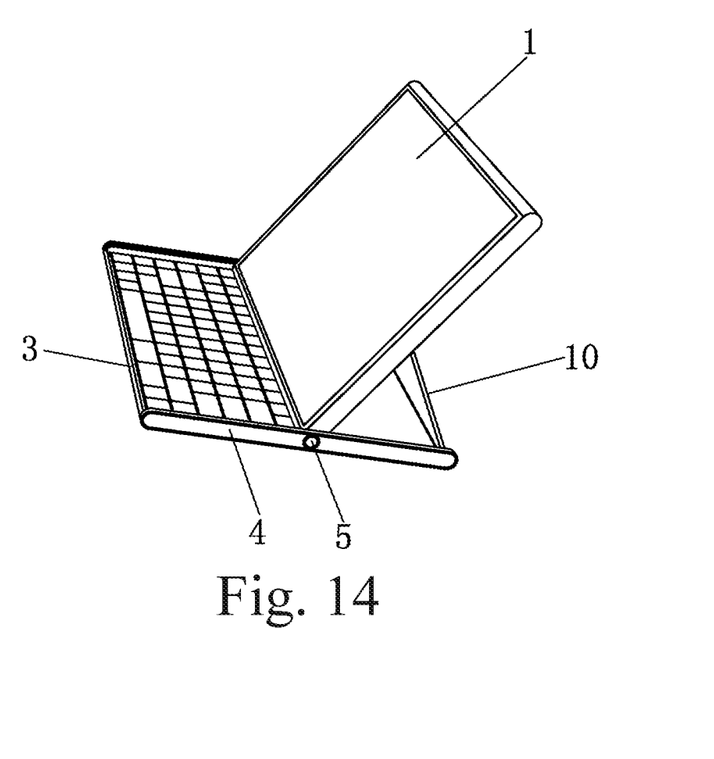
FIG. 14 is sketch view showing a utilizing state of the structure in FIG. 13.
Figure 15:
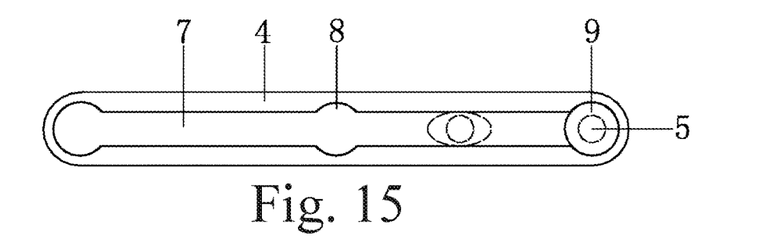
FIG. 15 is a first mode showing coordination of sliding rails and a sliding shaft according to the first, the second and the third preferred embodiment of the present invention.

As shown in FIGS. 13 and 14, according to a third preferred embodiment of the present invention, a protection device for an electronic tablet device comprises a protection housing 3, wherein sliding rails are provided on both a left side and a right side of the protection housing 3, a sliding shaft 5 capable of being fixed on a left side and a right side of the electronic tablet device is slidably connected in the sliding rails 4, wherein the sliding shaft 5 is capable of rotating in the sliding rails 4 and forming a positionable sliding connection via a positioning mechanism.

A supporting flap 10 is hinged on a rear side face of the protection shell 3, wherein the supporting flap 10 can be flipped towards the protection housing 3 to fit with the protection housing 3.

A hollow groove 11 with an identical shape with the supporting flap is opened on the protection housing 3, wherein the supporting flap 10 is hinged on a side of the hollow groove and the supporting flap 10 is capable of flapped into the hollow groove 11.

The structure mentioned above is simpler, wherein the slidways 2 are removed, the sliding shaft 5 is fixed on the electronic tablet device 1, a length of the sliding rails is increased. The structural design of the supporting flap 10 enables the electronic tablet device 1 being in a tilting effect, (See FIGS. 13 and 14).

A specific structure that the sliding shaft 5 is capable of rotating in the sliding rails 4 and forms a positionable sliding connection by a positioning mechanism is as follows. A strip-shaped sliding hole 7 is opened on the sliding rails 4, a plurality of positioning holes 8 are provided on the strip-shaped sliding hole 7 in sequence along a length thereof; the sliding shaft 5 is can be slidably connected with the strip-shaped sliding hole 7 and positioned in the positioning hole 8.

A specific structure of the positionable sliding connection structure can be set in the following ways.

Firstly, extending the structure of the single shaft 5 can be achieved. As shown in FIGS. 15-17 and 23, the sliding shaft 5 can adopt a structure that, see FIGS. 15 and 17, a pulley 9 is provided on an end of the sliding shaft 5 where the sliding shaft 5 and the sliding rail 4 is corporately sliding. The pulley 9 is a round wheel made of elastic material.

The sliding shaft 5 can also adopt a structure as follows. As shown in FIG. 16, the pulley 9 is a kidney shaped wheel body; wherein a maximum diameter of the kidney shaped wheel body is identical to a diameter of the positioning hole 8. Since the kidney shaped wheel 9 has different diameters, the kidney shaped wheel 9 is capable of respectively cooperating with the strip-shaped sliding hole 7 and the positioning hole 8 after being rotated for 90 degrees, so as to achieve a function of smooth sliding and positioning.

Figure 24:
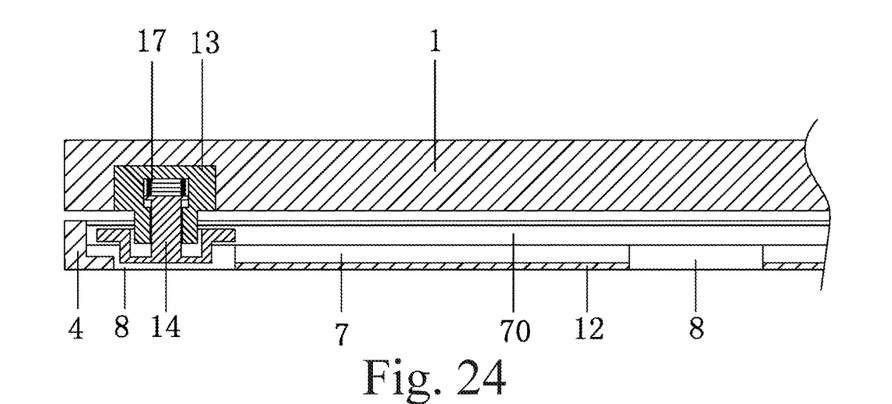
FIG. 24 is a schematic view of the fourth mode of the coordination of the sliding rails and the sliding shaft according to the third preferred embodiment of the present invention.
Figure 26:
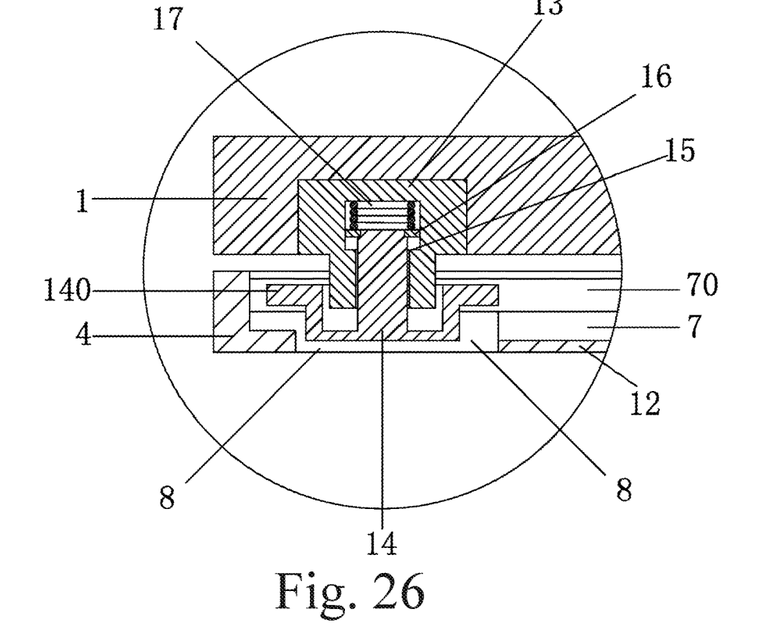
FIG. 26 is an enlarged partial view of the structure in FIG. 24.
Figure 27:
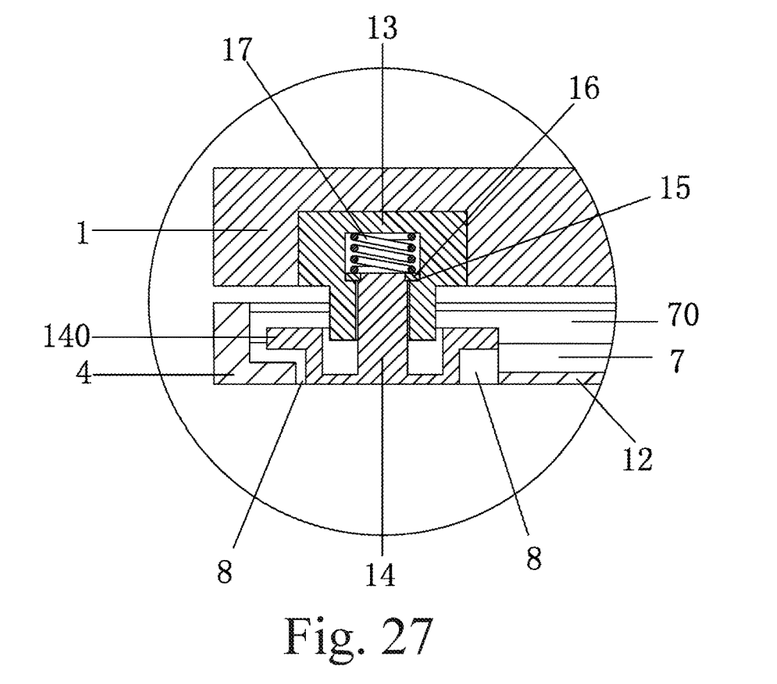
FIG. 27 is a sketch view of another operating state of the structure in FIG. 26.

Secondly, the structure can be achieved by expansion of the sliding shaft 5 and the strip-shaped sliding hole 7. As shown in FIGS. 24, 26 and 27, a strip-shaped hole 70 is provided on the strip-shaped sliding hole 7 on an internal side of the sliding rail 4. In design, a width of the strip-shaped hole 70 is greater than a width of the strip-shaped sliding hole 7. The width of the strip-shaped hole 70 is equal to or greater than a diameter of a stopping ring 140. The width of the strip-shaped sliding hole 7 is smaller than the diameter of the stopping ring 140. The diameter of the positioning hole 8 is equal to or greater than the diameter of the stopping ring 140.

A structure of the sliding shaft 5 comprises: an internal half shaft 13 fixed on a left side and a right side of the electronic tablet device 1 and an external half shaft 14 provided in the sliding rail 4; wherein a step 15 is provided on a wall of a shaft hole of the internal half shaft 13; an internal end of the external half shaft 14 is inserted in the shaft hole of the internal half shaft 13; a reset spring 17 is provided between an internal end of the external half shaft 14 and a bottom of s shaft hole of the internal half shaft 13; a clasping ring 16 capable of clasping with the step 15 is provided on an external column surface on the internal end of the external half shaft; and a stopping ring 140 is provided on an external end of the external half shaft 14.

A stopping bar 12 is provided in the strip-shaped sliding hole 7 between two adjacent positioning hole 8, the sliding shaft 5 which is sliding in the strip-shaped sliding hole is clamped on an internal side of the stopping strip 12.

A function achieved by the extension structure of the sliding shaft 5 and the strip-shaped sliding hole 7 is as follows.

The external half shaft 14 of the sliding shaft 5 can be pressed to change a whole length of the sliding shaft 5; wherein in an pressed state, the sliding shaft 5 is in a small length, the stopping ring 140 of the sliding shaft 5 is clamped in the strip-shaped hole 70; in a released state, the sliding shaft 5 is in a longer state under the function of the reset spring, the stopping ring 140 of the sliding shaft 5 is clamped in the positioning hole 8 of the strip-shaped sliding hole 7. Thus, in a pressed state, the sliding shaft 5 is not in the positioning hole 8, which achieves sliding in the strip-shaped sliding hole 7; in a released state, if the sliding shaft 5 is in the positioning hole 8, the sliding shaft 5 is inserted in the positioning hole 8, so that lateral sliding of the sliding shaft 5 is restricted; wherein the two states are switched by the pressing force and the elastic force of the return spring.

In actual application:

The electronic tablet device 1 is rotated relative to the protection housing 3; the internal half shaft 13 is rotationally and/or slidably connected with the external half shaft 14.

Relative sliding between the electronic tablet device 1 and the protection housing 3 is as follows. When a length of the sliding shaft 5 is shortened, an external end of the external half shaft 14 of the sliding shaft 5 is stopped inside the stopping strip 12, the stopping ring 140 is stopped in the strip-shaped hole 70, at the moment, the external half shaft 14 is out of restriction of the positioning hole 8. Thus, the electronic tablet device 1 is capable of sliding along the strip-shaped sliding hole 7, when sliding to a required position, i.e., a position of the positioning hole 8, loose the external half shaft 14, so that the external half shaft is ejected into the positioning hole 8, in such a manner that the electronic tablet device 1 is positioned and not capable of sliding.

Figure 25:
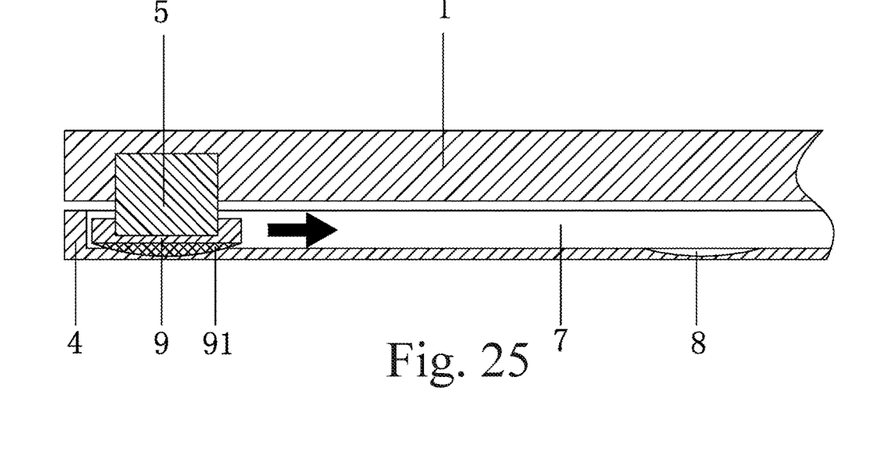
FIG. 25 is a schematic view of the fifth mode of coordination of the sliding rails and the sliding shaft according to the third preferred embodiment of the present invention.

The structural extension of the sliding shaft 5 and the sliding hole 7 may also be as follows. As shown in FIG. 25, the positioning hole 8 is a groove provided on a hole wall of the strip-shaped sliding hole 7. An elastic member 91 contacting with the hole wall of the strip-shaped sliding hole 7 is provided on the sliding shaft 5. The elastic member 91 is provided on an external surface of the sliding wheel 9. The elastic member 91 can be pressed and separated from the groove by pushing the sliding shaft 5, at the moment, the sliding shaft 5 is capable of sliding in the strip-shaped sliding hole 7, when the sliding shaft is sliding to a next positioning hole 8, the elastic member 91 can be ejected to be snapped in the groove for positioning.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A protecting and supporting device for an electronic tablet device, comprising: two slideways respectively provided on a left side and a right side of the electronic tablet device and a protection housing, wherein two sliding rails are respectively provided on a left side and a right side of the protection housing, the two slideways are provided between the two sliding rails; the slideway on the left side is slidably connected with the sliding rail on the left side of the protection housing by a first sliding shaft, the slideway on the right side is slidably connected with the sliding rail on the right side of the protection housing by a second sliding shaft, each sliding shaft is capable of sliding in the slideway and the sliding rail which are on an identical side, and the slideway and the sliding rail are capable of rotating around the sliding shaft which is on an identical side.

2. The protecting and supporting device, as recited in claim 1, wherein the sliding shaft and the sliding rail form a positionable sliding connection, wherein a specific structure is: a strip-shaped sliding hole is provided on the sliding rails, a plurality of positioning holes are provided in sequence along a length of the strip-shaped sliding hole; wherein the sliding shaft is capable of slidably connecting with the strip-shaped sliding holes and is positionable in the positioning hole.

3. The protecting and supporting device, as recited in claim 2, wherein a pulley is provided on an end of the sliding shaft where the sliding shaft and the sliding rail is corporately sliding; the pulley is a kidney-shaped wheel body or a round wheel made of elastic material.

4. The protecting and supporting device, as recited in claim 2, wherein a strip-shaped hole is provided on the strip-shaped sliding hole on an internal side of the siding rails, wherein a structure of the sliding shaft comprises: an internal half shaft provided in the slideway and an external half shaft provided in the sliding rail; wherein a step is provided on a wall of a shaft hole of the internal half shaft; an internal end of the external half shaft is inserted in the shaft hole of the internal half shaft; a reset spring is provided between an internal end of the external half shaft and a bottom of a shaft hole of the internal half shaft; a clasping ring capable of clasping with the step is provided on an external column surface on the internal end of the external half shaft; and a stopping ring is provided on an external end of the external half shaft.

5. The protecting and supporting device, as recited in claim 2, wherein the positioning hole is a groove provided on a hole wall of the strip-shaped sliding hole; an elastic member contacting and connecting with the hole wall of the strip-shaped sliding hole is provided on the sliding shaft; the elastic member is snapped in the groove for positioning; the elastic member is pressed and separated from the groove by pushing the sliding shaft; wherein the sliding shaft is capable of sliding in the strip-shaped sliding hole.

6. The protecting and supporting device, as recited in claim 1, wherein a supporting flap is hinged on the protection housing, wherein the supporting flap is capable of turning over toward the protection housing to fit with the protection housing.

7. The protecting and supporting device, as recited in claim 6, wherein a hollow groove for receiving the supporting flap is provided on the protection housing; wherein the supporting flap is hinged on the hollow groove and is capable of turning into the hollow groove.

8. A protecting and supporting device for an electronic tablet device, comprising a protection housing; wherein two slideways are respectively provided on both a left side and a right side of the protection housing; a sliding shaft capable of being fixed on a left side and a right side of the electronic tablet device is slidably provided in the slideways; the sliding shaft is capable of rotating in the slideways and form a positionable sliding connection by a positioning mechanism;
wherein the sliding shaft is capable of rotating in sliding rails and forming a positionable sliding connection by a positioning mechanism, wherein a specific structure is: a strip-shaped sliding hole is provided on the sliding rail, a plurality of positioning holes are provided in sequence along a length of the strip-shaped sliding hole; wherein the sliding shaft is capable of slidably connecting with the strip-shaped sliding holes and is positionable in the positioning hole.

9. The protecting and supporting device, as recited in claim 8, wherein a pulley is provided on an end of the sliding shaft where the sliding shaft and the sliding rail is corporately sliding; the pulley is a kidney-shaped wheel body or a round wheel made of elastic material.

10. The protecting and supporting device, as recited in claim 8, wherein a strip-shaped hole is provided on the strip-shaped sliding hole on an internal side of the siding rails, wherein a structure of the sliding shaft comprises: internal half shafts provided on a left side and a right side of the electronic tablet device and an external half shaft provided in the sliding rail; wherein a step is provided on a wall of a shaft hole of the internal half shaft; an internal end of the external half shaft is inserted in the shaft hole of the internal half shaft; a reset spring is provided between an internal end of the external half shaft and a bottom of a shaft hole of the internal half shaft; a clasping ring capable of clasping with the step is provided on an external column surface on the internal end of the external half shaft; and a stopping ring is provided on an external end of the external half shaft.

11. The protecting and supporting device, as recited in claim 8, wherein the positioning hole is a groove provided on a hole wall of the strip-shaped sliding hole; an elastic member contacting and connecting with the hole wall of the strip-shaped sliding hole is provided on the sliding shaft; the elastic member is ejected out and snapped in the groove for positioning; the elastic member is pressed and separated from the groove by pushing the sliding shaft; wherein the sliding shaft is capable of sliding in the strip-shaped sliding hole.

* * * * *